United States Patent [19]

Bockenstette

[11] 3,779,374

[45] Dec. 18, 1973

[54] MOLDED PLASTIC FASTENER

[75] Inventor: Kenneth R. Bockenstette, Cincinnati, Ohio

[73] Assignee: Vanguard Industries Inc., Cincinnati, Ohio

[22] Filed: Oct. 20, 1971

[21] Appl. No.: 191,116

[52] U.S. Cl. .................. 206/56 DF, 24/73 P, 85/80
[51] Int. Cl. ....................... B65d 69/00, F16b 21/08
[58] Field of Search .................. 206/56 AB, 56 DF; 24/73 P, 73 PM, 208 A, 213 R, 214; 85/80, 5 R

[56] References Cited
UNITED STATES PATENTS

| 3,342,095 | 9/1967 | Buntic | 24/73 P |
| 2,983,008 | 5/1961 | Von Rath | 24/73 HS |
| 3,083,429 | 4/1963 | Barlow et al. | 206/56 AB UX |
| 3,348,669 | 10/1967 | Powers | 206/56 DF UX |
| 3,177,540 | 4/1965 | Hall et al. | 85/80 |

FOREIGN PATENTS OR APPLICATIONS

| 937,220 | 9/1963 | Great Britain | 24/73 P |

Primary Examiner—Leonard Summer
Attorney—Cushman, Darby & Cushman

[57] ABSTRACT

A fastener molded of elastomeric material into an integral structure having a pair of locking parts integrally connected at their ends to the free end of the shank part of the fastener and the head part of the fastener respectively, the locking parts including perpendicularly disposed locking surfaces and inclined cam surfaces leading thereto from the free end of the shank part, the fastener serving to secure two elements together when moved axially through aperture menas formed therein into an operative position, during which movement the cam surfaces are operable to flex the locking parts both with a tortional movement about the integral end connections thereof and with an inward bending movement between the integral end connections thereof so that the flexure will cause the locking parts to move outwardly when the fastener reaches its operative position permitting the locking surfaces to effect the securement of the elements together. A plurality of the fasteners are integrally connected in a row with the shank parts extending generaly perpendicular to the extent of the row formation.

10 Claims, 5 Drawing Figures

PATENTED DEC 18 1973 3,779,374

INVENTOR
KENNETH R. BOCKENSTETTE

BY Cushman, Darby & Cushman
ATTORNEYS

MOLDED PLASTIC FASTENER

This invention relates to fasteners and more particularly to improvements in fasteners of the type molded of a plastic material in a one-piece integral structure.

One-piece plastic fasteners have been proposed in the prior art for securing together various elements. An exemplary use of such fasteners is to secure the lid element to the container element of a tote box assembly. Tote boxes of this type are disclosed in U.S. Pat. Nos. 3,360,162 and 3,379,341. Tote boxes according to the above-noted patents are commonly used in the delivery of goods, such as toiletries, from a wholesaler or distributor to a retailer such as a supermarket, discount store or the like, and the purpose of locking such boxes is simply to discourage petty pilferage rather than positively to prevent theft. Such tote box assemblies are provided with aligned apertures in the flanges of the container element and lid element through which a fastener is moved to effect the securement of the lid element and the container element in a locked condition together.

An object of the present invention is to provide a fastener of the type described having improved locking parts operable to flex both with a tortional movement and with an inward bending movement in response to the movement thereof axially through aperture means in the elements to be secured together.

Another object of the present invention is the provision of a fastener of the type described which is particularly constructed for use in temporarily locking tote box assemblies and the like.

Another object of the present invention is the provision of a fastener of the type described which is simple in construction, efficient in operation, and economical to manufacture.

These and other objects of the present invention will become more apparent during the course of the following detailed description and appended claims.

The invention may best be understood with reference to the accompanying drawings wherein an illustrative embodiment is shown.

Figure 1:
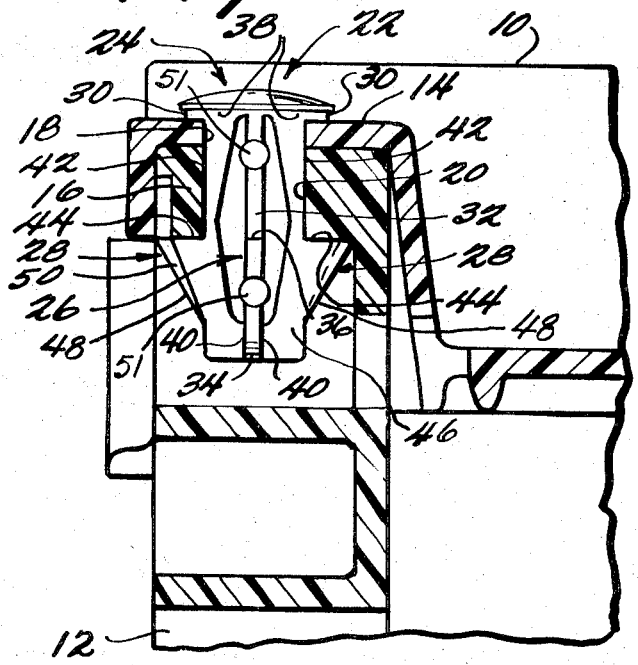
FIG. 1 is a fragmentary vertical sectional view through an aperture means of a conventional tote box assembly showing a fastener, embodying the principles of the present invention, disposed in operative locking position therein.

Referring now more particularly to the drawings, there is shown in FIG. 1 thereof a portion of a conventional tote box assembly of the type disclosed in the aforesaid U.S. patents. The portion of the assembly shown includes a lid element 10 and a container element 12 each having a horizontal peripheral flange 14 and 6 respectively. The elements are provided with aperture means, such as apertures 18 and 20 respectively, for receiving a locking device by which the two elements are secured together. A fastener, generally indicated at 22, embodying the principles of the present invention, is shown in FIG. 1 as a locking device for the two elements. It will be understood that the fastener 22 is susceptible to general use in securing together any two elements and that the tote box assembly shown is for purposes of illustration. It will also be understood that the present fastener 22 is particularly constructed for the specific purpose of securing the tote box assembly shown.

Figure 2:
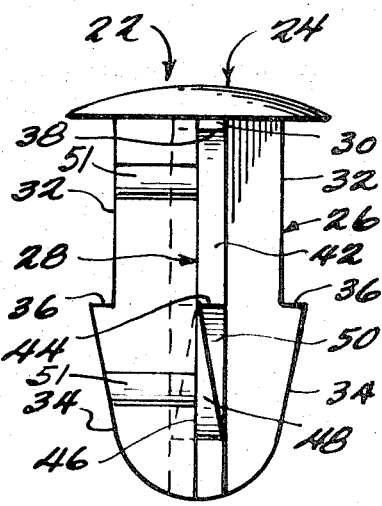
FIG. 2 is an elevational view of the fastener in a position rotated about its axis 90°.

The fastener 22 is molded of an elastomeric resilient material to form a one-piece integral structure. The structure includes a head part 24, a shank part 26, and a pair of locking parts 28. The head part 24 includes a main circular dome-like portion having a pair of depending pad portions 30 formed on the flat surface thereof. The shank part 26 extends longitudinally outwardly from the flat surface of the head part 24 and includes a first portion having a pair of outwardly facing diametrically opposed surfaces 32 operable to engage the wall of the aperture means when the fastener is disposed in operative position therein, as shown in FIG. 1. The shank part 26 also includes a second free end portion which extends outwardly from the first shank portion and is provided with a pair of guide surfaces 34 which extend outwardly from the free end of the shank part in diametrically opposed relation and then longitudinally in a direction toward the aperture engaging surfaces 32. In the preferred embodiment shown, the guide surfaces 34 diverges with respect to each other to a distance slightly greater than the aperture size of the elements to be fastened together. With this configuration, there is provided a pair of upwardly facing shoulders defining locking surfaces 36 disposed in a plane generally perpendicular to the axis of the head and shank parts, all as best shown in FIG. 2.

It will be noted that the shank part is generally of thin wall construction having a generally elongated rectangular cross-sectional configuration. The locking parts 28 are disposed on opposite sides of the shank part 26 as well as on opposite sides of a plane perpendicular to the flat wall form of the shank part passing through the longitudinal axis of the integral structure. Each locking part 28 includes a first portion which is connected integrally at 38 with the head part and extends longitudinally outwardly thereof in spaced coextensive relation with the first shank portion and a second portion extending from the first locking portion in spaced coextensive relation with the second shank portion and having its free end integrally connected at 40 with the free end of the shank part 26.

Each first locking portion is formed with an outwardly facing surface 42 adapted to engage the aperture when the fastener is disposed in operative relation therein. Extending outwardly from the end of each aperture engaging surface 42 remote from the head part 24 is a locking surface 44 which, in the embodiment shown, is preferably disposed within the plane of the locking surfaces 36. As shown, the locking surfaces 44 extend outwardly from the associated surfaces 42 a distance greater than the outward extent of the locking surfaces 36 from their associated surfaces 32. The locking surfaces 44 thus provide the majority of the locking effect of the present fastener. Indeed, the locking surfaces 36 may be omitted if desired although they are preferred as shown. Moreover, while it is preferred to dispose the locking surfaces 44 and 36 within a plane perpendicular to the axis of the fastener as aforesaid, it is within the contemplation of the present invention to provide the locking surfaces with a sloping configuration rendering the fastener capable of being removed from its operative position by a flexing action in accordance with known procedures. The configuration shown is preferred since the present fastener 22 is particularly constructed for use with a tote box assembly wherein it is desired to temporarily lock the tote box element in a fashion requiring a tool to release the elements.

Figure 3:
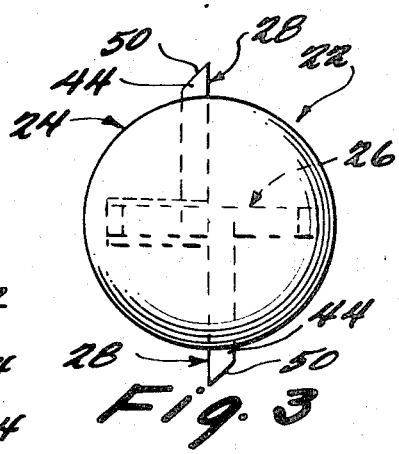
FIG. 3 is a top plan view of the fastener.

In accordance with the principles of the present invention, the second locking portions are provided with cam surfaces operable in response to the movement of the fastener 22 axially through the aperture means to flex the locking parts both with a tortional movement about the end connections 38 and 40 thereof and with an inward bending movement between the end connections 38 and 40 thereof. This function is obtained in the preferred embodiment shown by providing each locking part 28 with a side wall surface 46 disposed within the aforesaid plane extending perpendicularly to the shank part 26 and intersecting the longitudinal axis of the fastener. Each second locking portion includes a first cam surface 48 which intersects the associated wall surface 46 at an angle of slightly less than 90°. As best shown in FIGS. 1, 2 and 3 the cam surfaces 48 extend in converging relation with respect to each other from the outer ends of the locking surfaces 44. Each second locking portion also includes a second cam surface 50 which intersects the associated first cam surface 48 generally diagonally and forms therewith an angle of approximately 45°.

Figure 4:
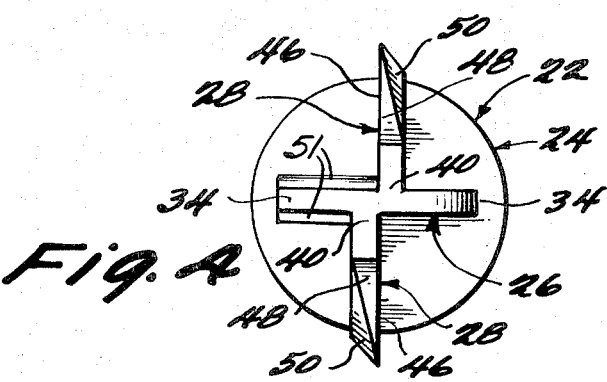
FIG. 4 is a bottom plan view of the fastener.

It will be understood that the fastener 22 embodying the construction indicated above is capable of being molded in a two-part die, the die parts being movable toward and away from each other in the direction of extent of the shank part 26. In accordance with conventional practice, one part of the die may be provided with ejector pins to eject the fasteners 22 from the die part after the two die parts have been separated. In order to receive the ejector pins, the one die part is formed with a pair of cylindrical recesses which are of a diameter slightly greater than the thickness of the shank part 26. Thus, the recesses in the one die part form two spaced generally cylindrically shaped thickened portions 51 on the associated portion of the shank part 26, as best shown in FIGS. 1, 2 and 4. As previously indicated, the fastener 22 is made of an elastomeric or resilient material and the material may be one of the well-known elastomers such as polyethylene, polypropylene, or the like, the preferred material shown being polypropylene.

Figure 5:
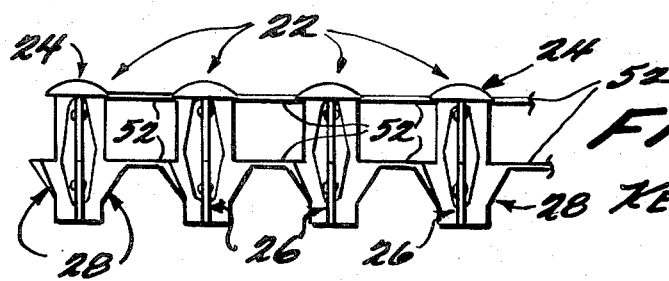
FIG. 5 is a side elevational view of a plurality of fasteners integrally interconnected in parallel row formation.

Referring now to FIG. 5, the fastener 22 is preferably molded in a multiple-cavity die set so as to integrally form a plurality of fasteners 22 disposed in parallel row formation and integrally connected together, as by a pair of parallel connecting webs 52 extending between adjacent portions of the head part 24 of adjacent fasteners and adjacent portions of the second locking parts at a level substantially aligned with the locking surfaces 44. It will be understood that the connecting webs 52 may be severed to provide individual fasteners or, alternatively, the plurality of fasteners integrally formed in parallel row formation may be utilized with a fastener driving device of the type having a magazine for receiving a strip of fasteners in row formation and successively feeding the leading fastener of the row into a position to be severed from the strip and driven by the device. Such tools are well known and need not be described herein since they do not form a part of the present invention.

Since the fastener 22 of the present invention is particularly constructed to lockingly secure together the lid and container elements of a tote box assembly, the operation of the present fastener will be described in conjunction with this use. In the embodiment shown, it is assumed that the lid element 10 of the tote box assembly is disposed in cooperating relation with the container element 12 so that the apertures 18 and 20 thereof are in alignment. A fastener 22 is positioned so that its free end will enter the aperture 18 upon axial movement of the fastener within the aperture means provided. The fastener is then pushed or driven into the aperture, during which movement the guide surfaces 34 of the shank part 26 and the cam surfaces 48 and 50 of the locking parts will initially engage the wall of the aperture means at portions thereof spaced circumferentially thereabout. This engagement serves to maintain the fastener in axial alignment within the aperture means and, as the axial movement of the fastener progresses, the engagement of the cam surfaces 48 and 50 serve to progressively flex the locking parts 28 with both a tortional movement about their end connections 38 and 40 and with an inward bending movement between their integral end connections 38 and 40. As the fastener reaches its operative position, the pad portions 32 will engage the upper surface of the lid element 10 and the locking surfaces 44 and 36 will move out of the lower aperture 20 of the container element 12. The flexure of the locking part and the resilience of the material thus cause the locking parts to move outwardly so as to position the locking surfaces 44 against the surface of the container element surrounding the aperture 22. In a like manner, the locking surfaces 36 of the shank part move into engagement with the adjacent surface of the container element.

It will be noted that the positioning of the locking surfaces 36 is accomplished by a distortion of the material forming the shank part 26 rather than by a flexure thereof as is the case with the locking part 28. The amount of distortion is relatively slight and hence there is very little contact area provided by the locking surfaces 36 to insure a positive locking action. On the other hand, the locking surfaces 44 provide substantial locking surface area which insures an adequate locking action. It will be understood that in order to provide for such extensive locking surface it is necessary to provide a relatively great degree of flexure while at the same time permitting ready movement of the fastener into its operative position. This result is accomplished by the present fastener construction through the provision of flexure by both tortional movement and bending movement. Thus, a greater extent of flexure is provided by the present arrangement than could be provided by either tortional movement or bending movement alone given the same strength to the component parts and the same resilient forces involved. It will also be understood that bending movement is achieved primarily by the engagement of the cam surfaces 48 with the aperture means; whereas the tortional movement is accomplished primarily by the engagement of the cam surfaces 50 with the aperture means. Tortional movement is accomplished by virtue of the angle of the surfaces 50 both with respect to their angular position of engagement with the wall of the aperture means and with respect to the end connections 38 and 40.

When the fastener 22 is in its operative position, it will be noted that the pad portions 30 engage the upper surface of the flange 14. These pad portions serve to maintain the dome-like circular portion of the head part 24 slightly above the surface of the flange to permit convenient access thereunder of a severing tool, such as a knife or end cutter, by which the head part is severed to release the lid element 10 and permit the container element 12 to be opened by authorized personnel.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed in the spirit and scope of the following claims.

What is claimed is:

1. A fastener for securing together elements having aperture means formed therein comprising an integral structure molded of a resilient material, said integral structure including a head part operable to engage one of said elements when said integral structure is disposed in an operative position in relation to said elements, a shank part having a first portion extending from said head part operable to engage within the aperture means when said integral structure is disposed in said operative position and a second free end portion extending from said first shank portion operable to extend beyond said aperture means when said integral structure is disposed in said operative position, said first shank portion having diametrically opposed aperture engaging surfaces of relatively small width with respect to the size of said aperture means, said second shank portion having guide surfaces of relatively small width extending from the free end thereof outwardly in opposite direction and toward the aperture engaging surfaces of said first shank portion, said shank part extending continuously between said aperture engaging surfaces throughout the longitudinal extent thereof, and a pair of locking parts disposed on opposite sides of said shank part, each of said locking parts having a first portion formed with an end thereof integral with said head part and extending therefrom in spaced coextensive relation to said first shank portion and a second portion extending from said first locking portion in spaced coextensive relation to said second shank portion and being integrally joined at its end with the adjacent free end of said second shank portion, said locking parts having outwardly facing aperture engaging surfaces formed in the first portions thereof, locking surfaces extending outwardly from said aperture engaging surfaces for engaging another element adjacent said aperture means when said integral structure is in said operative position, and cam surface means extending from said locking surfaces and converging adjacent the free end of said shank part operable in response to the movement of said integral structure into said operative position to engage the aperture means at opposed portions angularly spaced from the opposed portions engaged by said shank part guide surfaces to cause said locking parts to progressively flex both with a tortional movement about their integral end connections and with an inward bending movement between their integral end connections so that said flexure will cause said locking parts to move outwardly when said integral structure reaches said operative position permitting said locking surfaces to engage the other element adjacent said aperture means and thereby secure said elements together, said cam surface means on each locking part including two portions, one of which faces in a direction substantially radially outwardly with respect to the longitudinal axis of said integral structure and the other of which faces in a direction generally at an angle of approximately 45° with respect to the radially outward direction in which said one portion faces.

2. A fastener as defined in claim 1 wherein said shank part includes a pair of shoulders providing locking surfaces facing toward said head part and extending between the aperture engaging surfaces and guide surfaces of said shank part.

3. A fastener as defined in claim 1 wherein said shank part is of generally flat wall form.

4. A fastener as defined in claim 3 wherein said locking parts are disposed on opposite sides of a plane perpendicular to the flat wall extent of said shank part and intersecting the longitudinal axis of said integral structure.

5. A fastener as defined in claim 4 wherein each of said locking parts includes a side wall surface substantially coincident with said plane, said one cam surface means portion comprising a first flat cam surface intersecting said side wall surface and forming an angle of slightly less than 90° therewith, and said other cam surface means portion comprising a second flat cam surface generally diagonally intersecting said first cam surface and forming an angle of approximately 45° therewith.

6. A fastener as defined in claim 5 wherein said shank part includes a pair of shoulders providing locking surfaces facing toward said head part and extending between the aperture engaging surfaces and guide surfaces of said shank part.

7. A fastener as defined in claim 6 wherein said locking surfaces are disposed in a plane substantially perpendicular to the longitudinal axis of said integral structure.

8. A fastener as defined in claim 7 wherein said head part includes a circular portion having a pair of depending portions thereon adapted to engage said one element so as to space said circular head portion therefrom to facilitate severing said head part for removal of said fastener to release said elements.

9. A fastener as defined in claim 1 wherein said locking surfaces are disposed in a plane substantially perpendicular to the longitudinal axis of said integral structure.

10. A plurality of fasteners as defined in claim 1 integrally interconnected in parallel row formation with said shank parts extending generally perpendicular to the extent of the row formation.

* * * * *